US012382343B2

(12) United States Patent
Ng et al.

(10) Patent No.: US 12,382,343 B2
(45) Date of Patent: Aug. 5, 2025

(54) DYNAMIC RESOURCE ALLOCATION FOR NETWORK SLICES

(71) Applicant: Verizon Patent and Licensing Inc., Basking Ridge, NJ (US)

(72) Inventors: Mason Ng, Jersey City, NJ (US); Kevin Xu, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 399 days.

(21) Appl. No.: 18/101,136

(22) Filed: Jan. 25, 2023

(65) Prior Publication Data

US 2024/0251295 A1    Jul. 25, 2024

(51) Int. Cl.
*H04W 28/16*    (2009.01)
*H04W 48/16*    (2009.01)

(52) U.S. Cl.
CPC ........... *H04W 28/16* (2013.01); *H04W 48/16* (2013.01)

(58) Field of Classification Search
CPC .............................. H04W 28/16; H04W 48/16
See application file for complete search history.

(56) References Cited

U.S. PATENT DOCUMENTS 10,911,894 B2 *    2/2021    Ramer ................... H04W 4/02

* cited by examiner

*Primary Examiner* — Diane D Mizrahi

(57) ABSTRACT

One or more computing devices, systems, and/or methods for dynamic resource slice allocation are provided. A bidding engine dynamically tracks available network slices and available edge computing resources to generate a current list of resource slices corresponding to combinations of available network slices and available edge computing resources. A bidding auction is conducted for the current list of resource slices. A user equipment device is determined to be a winner of the bidding auction for a resource slice based upon a bidding request from the user equipment device. In this way, the user equipment device is provide with access to the resource slice based upon a determination that the user equipment device won the bidding auction.

20 Claims, 12 Drawing Sheets

DYNAMIC RESOURCE ALLOCATION FOR NETWORK SLICES

BACKGROUND

Many applications that run on user equipment devices (e.g., wireless devices, cellular phones, tablets, etc.) can utilize various external resources and services for execution. For example, a videogame application hosted on a user equipment device may access a "cloud-based" gaming service so that a user of the videogame application can compete in various videogame competitions with other users of the videogame application. Competing in the videogame competitions consumes network resources, and thus the user's experience in execution of the videogame application will be affected by network conditions and architecture—e.g., latency of communications, amount of bandwidth available for communications, etc. In some instances, the videogame application and the user equipment device may be capable of utilizing external compute resources, such as CPU, GPU, memory, and/or other compute resources provided by multi-access edge compute sites, for improved performance.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
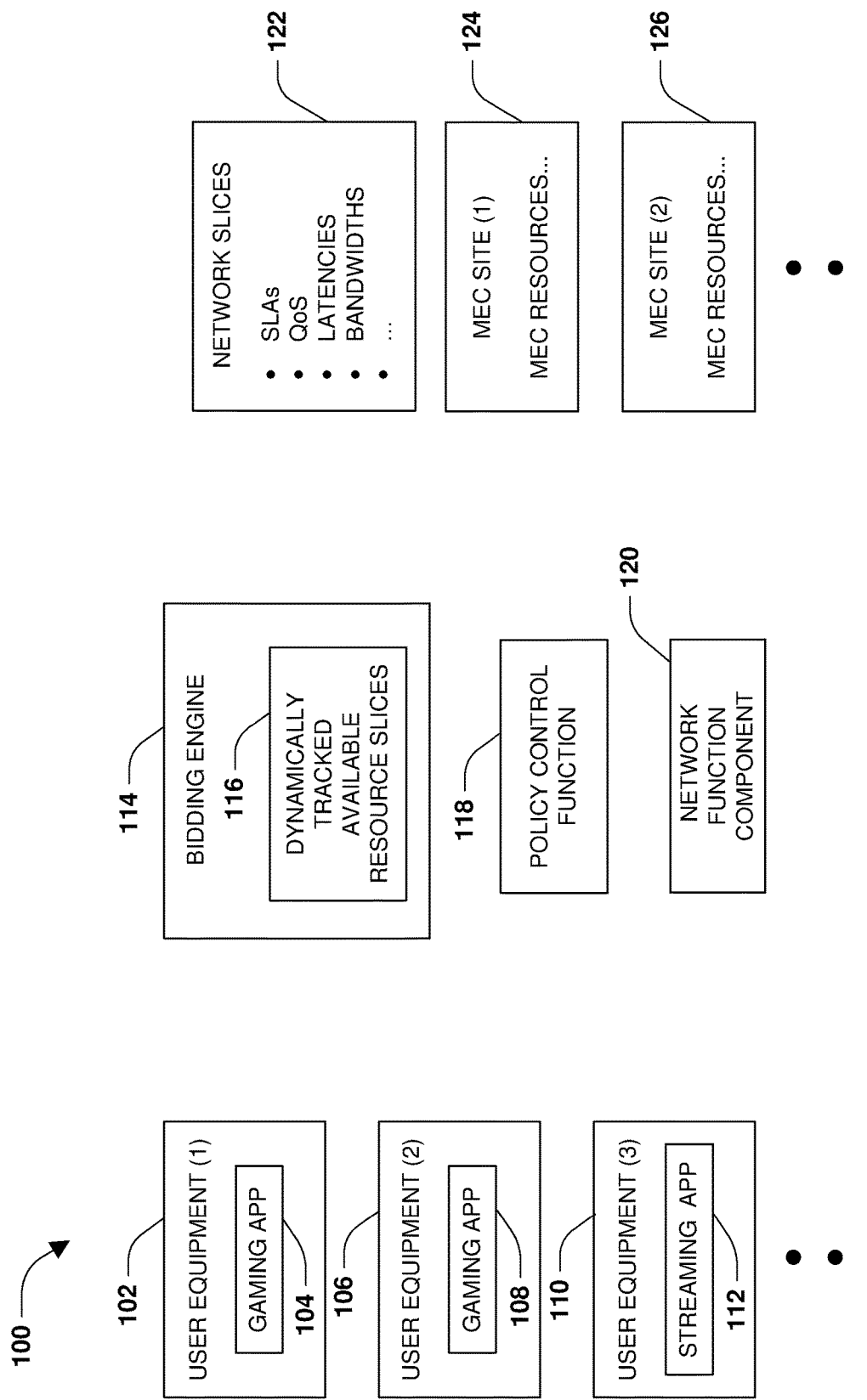
FIG. 1 is a diagram illustrating an example of a system for dynamic resource allocation for network slices.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

One or more systems and/or techniques for dynamic network slice resource allocation and selection are provided. In particular, certain wireless networks (e.g., a 5G wireless network; an LTE or 4G wireless network; or any other types of network) provide network slices (e.g., an end-to-end virtual/logical network for transporting network traffic such as data from an application to a remote service). The network slices are a feature in networks (such as wireless networks) that enable the lifetime management of end-to-end virtual/logical networks, with expected levels of service on top of a shared physical network infrastructure. Different network slices can implement different end-to-end quality of service (QOS), service level agreements (SLAs), capabilities and/or resource assignments that the wireless network guarantees to deliver to user equipment devices (e.g., wireless devices, cellular devices, phones, tablets, etc.). Such end-to-end service and quality differentiation allows a network operator to implement fine-grained resource policies suited for different applications and/or user equipment devices, which allows for a better user experience and more efficient use of network resources across the total user population.

Edge computing—also referred to as "multi-access edge computing" (MEC)— brings technology resources closer to the user equipment devices. Instead of data (e.g., data of an application hosted by a user equipment device) being processed and stored at a distant data center, the data can be processed and stored at a multi-access edge computing site closer to the user equipment device. This significantly reduces communications latency and enables improvements in the user experience for user equipment devices and applications, such as through processing offload.

As part of current network architecture, a policy control function (PCF) in a network core (e.g., a 5G core) can provision a number of pre-defined network slices that represent different end-to-end service characteristics. The policy control function may then provide indicators for these network slices to the user equipment devices, typically as part of the user route selection policy (URSP) rules installed by the PCF on user equipment devices. The URSP rules allow an application on a user equipment device to pick a user "route" (e.g., a network slice) to be associated with a session between the application and a network function component such as a user plane function (UPF) for communicating data over the network. The policy control function can perform updates (e.g., over-the-air updates) of the URSP rules in the event network slice availability changes.

Unfortunately, the URSP rules may not align with the dynamics of MEC resource availability and demand at any given point in time. In particular, the current architecture does not directly connect and correlate the dynamic nature of demand for resources at any point in time and associated resource availability at such points in time (e.g., SLAs, QoS, latency, bandwidth, CPU, GPU, memory, storage devices, etc.) with slice resource lifecycle management and prioritization. For example, an application executing on a MEC may be resource restricted during a period of time based on the level of overall usage of the MEC, yet the network slice service characteristics for the network slice that is providing the communications path between the user device and the MEC expects that the application will execute at full resource levels. It is difficult for a network operator to prioritize and efficiently allocate a particular slice at a specific time in a specific geography in a manner that optimizes slice assignments within the constraints of available resources. As used herein, resource slice may refer to the combination of network resources and functions used to construct a network slice and the edge computing resources available for an application workload It is difficult to dynamically allocate such resources to user equipment devices that will provide improved performance when and where the resources will be utilized (e.g., an allocation of CPU and GPU from a multi-edge computing site nearby a user equipment device hosting a videogame app that will be more performant when a user will be playing the videogame app at a particular point in time such as in the evening after dinner). Also, because resources are finite and time-bound, it is important to dynamically allocate resources in a manner that fully optimizes their use—i.e., that the resources are neither under-utilized nor over-saturated by applications that could utilize the resources. Thus, current network architecture provides inefficient resource allocation, suboptimal performance for applications, and cannot take into account dynamic and real-time considerations of resource availability and demand in relation to particular points in time and for given geography.

In order to overcome these technical deficiencies and inefficient/suboptimal resource allocation and utilization, techniques for dynamic network slice resource allocation are provided herein. These techniques capture real-time and dynamic demands for resources so that dynamic edge computing resource assignment and prioritization can be performed with network slice allocation. In particular, network slices in a wireless network (e.g., a 5G wireless network) are provisioned with dynamic edge computing resource assignment by utilizing a bidding engine that is custom configured to implement real-time bidding for "resource slices" that include combinations of network slices and edge computing resources.

The bidding engine is implemented as an optimization extension for the policy control function of the wireless network. The bidding engine maintains an up-to-date knowledge database of available network slices and edge computing resources such as CPU, GPU, memory, storage workloads, and/or other multi-access edge computing (MEC) resources available for creating resource slices. The bidding engine brokers resource slices to mobile applications through a real-time bidding mechanism in order to derive optimal resource slice allocation priority, dynamically, based upon real-time demand for resources. This results in more efficient resource utilization and conservation of network and edge computing resources, and improves performance of the mobile applications that are allocated the resource slices. Additionally, bidding auctions hosted by the bidding engine can be performed on-demand in real-time as mobile applications are requesting resources for utilization or can be scheduled in advance for a particular event (e.g., hosting a bidding auction for additional network bandwidth and GPUs during an upcoming videogame competition event).

Network and edge compute resources are finite resources in both capacity and time. The bidding engine is configured for dynamically determining how to efficiently allocate these resources to applications so that performance of the applications is increased for improved operation of user equipment devices using the applications. For example, operation of a user equipment device is improved by offloading the processing of data to edge computing resources hosted by a remote multi-access edge computing site since the user equipment device such as a mobile phone may have limited compute and storage resource.

The bidding engine is configured to dynamically identify available resources at any given point in time so that the bidding engine takes into account up-to-date resource availability. The bidding engine also takes into account current demand by applications for resources during bidding auctions for the resources so that the resources are allocated in an optimal and efficient manner (e.g., allocation based upon need and value/benefit to the applications so that certain applications that will receive a greater value/benefit may be assigned the resources). The bidding engine takes into account the proximity of resources to requesting applications. This allows the bidding engine to select and assign resources from a particular multi-access edge computing site that is located geographically closer to an application, which improves performance and reduces latency.

The bidding engine hosts bidding auctions for allocating combinations of both network slices (e.g., user routes having certain SLAs, QoS, latencies, bandwidth, jitter, etc.) and edge computing resources (e.g., CPUs, GPUs, memory, storage devices, network connectivity bandwidth, etc.) for a time slot. These combinations may be referred to as "resource slices" to indicate that they can include both network slice assignments and resource allocations for edge computing resources. An application with a "winning" bid may be provided access to a combination of both network and edge computing resources specified in the winning bid. The application is guaranteed to receive the resources won by the winning bid, such as end-to-end network connectivity (e.g., guaranteed latency and bandwidth for the application to access a remote service) and edge computing resources. In this way, the bidding engine takes into account supply and demand of two-dimensions of resources (network slices and edge computing resources) in order to allocate the resources based upon the value of the resources to the requesting application (e.g., an allocation that will provide a level of improved performance that an application is seeking). The resources are allocated in a dynamic manner that can change and react to temporal changes (e.g., peak demand time periods such as 8 pm vs low demand time periods such as 2 am), events (e.g., increased video streaming resource demand during an upcoming sporting event, a holiday, a concert, etc.), and other fluctuations in real-time dynamic supply and demand. Resources are allocated in a manner that improves performance of mobile devices and applications, while conserving resources so that the finite resources are not over provisioned for a particular application such that performance guarantees for other applications cannot be satisfied.

FIG. 1 is a diagram illustrating an example of a system 100 for dynamic network slice resource allocation. A wireless network may provide network communication capabilities so that user equipment devices can communicate voice and data over the wireless network. The wireless network may include a policy control function 118 that provides network slice lists to the user equipment devices to use for connecting and communicating over the wireless network. In some embodiments, a network slice list corresponds to user route selection policy (URSP) rules of routes (network slices) for utilizing the routes. The user route selection policy rules may be installed on a user equipment device. The policy control function 118 is configured to provide dynamic network slice list updates to the user equipment such as in response to a user equipment device winning a bid for a resource slice that includes a new network slice (route) whose information can be conveyed to the user equipment device through an update. The user equipment device can utilize the network slice list (a certain user route selection policy rule) to establish a session with a network function component 120 (a user plane function of a 5G network) so that an application on the user equipment device can communicate over the wireless network using the network slice associated with the winning bid, such as to connect to a gaming service for playing an online videogame. In this way, user route selection policy rules allow the application to select a route (a network slice) to be associated with an application session.

The edge computing resources may be available from multi-access edge computing sites, such as a first multi-access edge computing site 124, a second multi-access edge computing site 126, and/or other multi-access edge computing sites located in various geographical regions. A multi-access edge computing site may include CPUs, GPUs, memory, storage devices, various levels of bandwidth, and/or other edge computing resources and compute resources that could be leveraged by the applications of the user equipment devices connecting to the wireless network through the network function component 120. Because a user equipment device has limited computing resources, performance of an application hosted by the user equipment device can be enhanced/improved by offloading data storage and processing from the user equipment device to edge computing resources of a multi-access edge computing site. The closer the user equipment device is to the multi-access edge computing site, the lower the latency that the user equipment device may experience. Edge computing resource availability dynamically changes over time since edge computing resources are finite and applications will use the edge computing resources more or less at various points in time. Demand for the edge computing resources dynamically changes over time, such as where there is peak usage in the evening after dinner where users may have more free time to utilize applications on their mobile phones and tablets, while there may be lower usage during the night when the users are sleeping. Also, there may be higher usage during an event (e.g., users streaming a sporting event, users competing in a videogame competition, etc.).

A bidding engine 114 may be deployed within the wireless network such as within a 5G core. The bidding engine 114 is configured to perform efficient and optimized resource allocation by dynamically allocating combinations of network slices 122 and edge computing resources of the multi-access edge computing sites as resource slices to user equipment devices based upon real-time demand for the combinations of the network slices 122 and the edge computing resources. The network slices 122 correspond to different service level agreements (SLAs), quality of service (QoS), latencies, bandwidths, and/or other communication network (user route) characteristics. As previously discussed, the edge computing resources correspond to CPUs, GPUs, memory, storage devices, various levels of bandwidth, etc. In this way, the bidding engine 114 can allocate resource slices based upon current demand of resources, current availability/supply of resources, temporal variances (e.g., peak usage times), events of predicted high usage, geographical proximity between the multi-access edge computing sites and the user equipment, etc.

In some embodiments, a first user equipment device 102, a second user equipment device 106, a third user equipment device 110, and/or other user equipment devices may be connected to the wireless network that includes the bidding engine 114. Applications hosted on the user equipment devices may engage in bidding auctions hosted by the bidding engine 114 in order to bid on various resource slices available for access through sessions (application sessions) that the applications can establish through the network function component 120. The applications may correspond to a gaming application 104, a gaming application 108, a streaming application 112, and/or a variety of other types of applications.

The bidding engine 114 is configured to dynamically track available network slices 122 and edge computing resources of the first multi-access edge computing site 124, the second multi-access edge computing site 126, and/or other resource provider sites that provide computing resources (e.g., CPUs, GPUs, memory, storage, etc.). The bidding engine 114 can then make available for bidding by applications the available network slices and edge computing resources, for example, according to usage characteristics desired by the application.

In some implementations, the bidding engine 114 may create combinations (resource slices 116) of the available network slices and available edge computing resources in order to facilitate allocation and bidding. The available resource slices 116 may be tracked on an on-going basis (e.g., periodically), and may be made available to user equipment devices in response to a request from a user equipment device for a current list of resource slices available for bidding, and/or as part of performing a bidding auction. In this way, the bidding engine 114 may provide the current list of resource slices to one or more user equipment devices, such as to a user equipment device hosting an application requesting the current list of resource slices.

The bidding engine 114 may host a bidding auction for a resource slice. In some embodiments, the bidding engine 114 may host the bidding auction based upon a bidding request from one or more applications for bidding on the resource slice. The bidding engine 114 may host the bidding auction as a real-time live bidding auction where applications can submit bidding requests to join in the bidding auction and submit bid values for consideration by the bidding auction. The bidding engine 114 may determine a winner user equipment device (e.g., a user equipment device hosting an application that submitted a highest bid value). Accordingly, the bidding engine provides the application of the winner user equipment device with access to the resource slice. In particular, the bidding engine instructs the policy control function 118 to send an updated network slice list, which includes the resource slice won by the application, to the winner user equipment device. The application of the winner user equipment device can use the updated network slice list to establish a session with the network function component 120 for accessing and utilizing the edge computing resources associated with the network slice.

Figure 2:
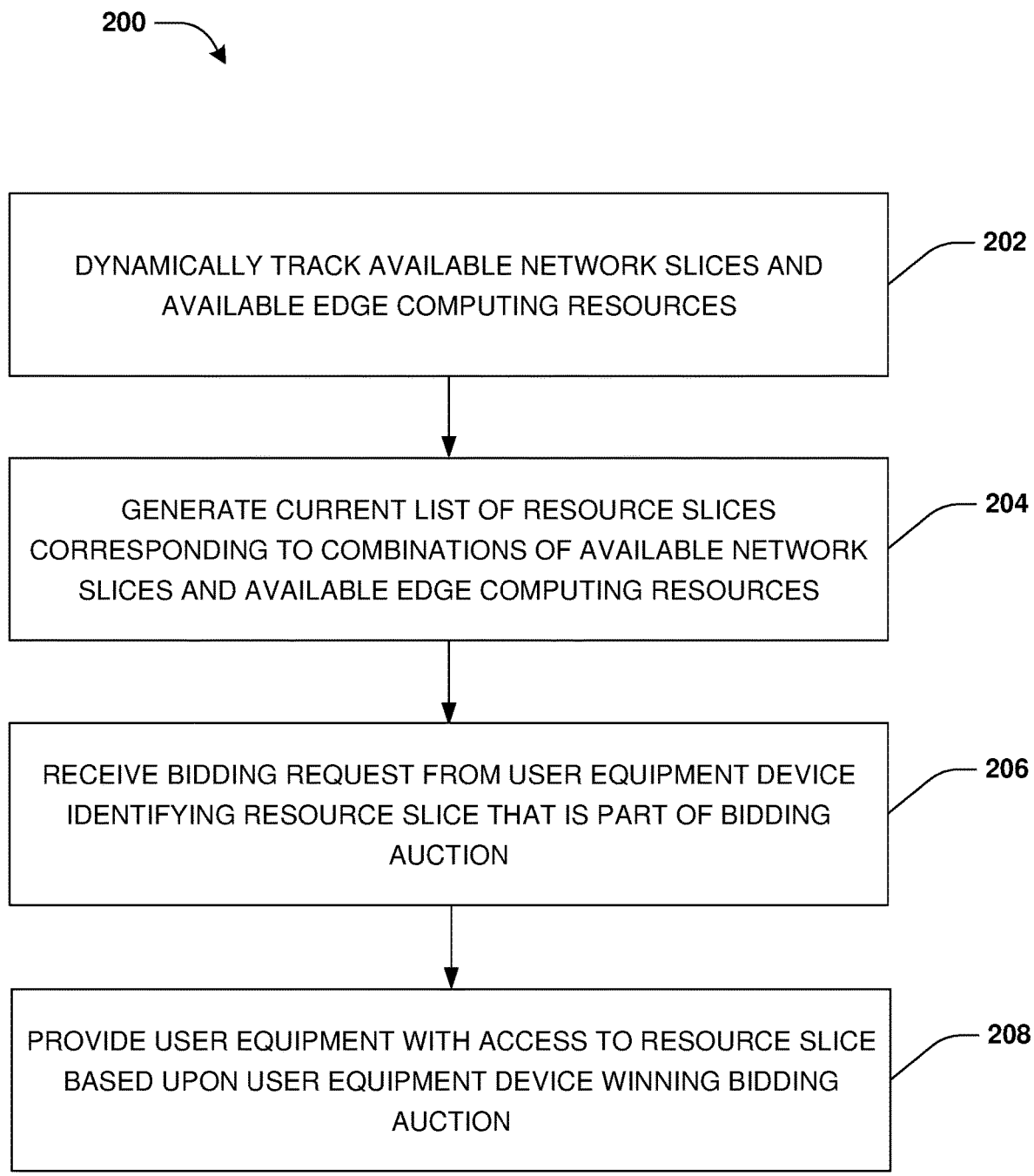
FIG. 2 is a flow chart illustrating an example method for dynamic resource allocation for network slices.
Figure 3A:
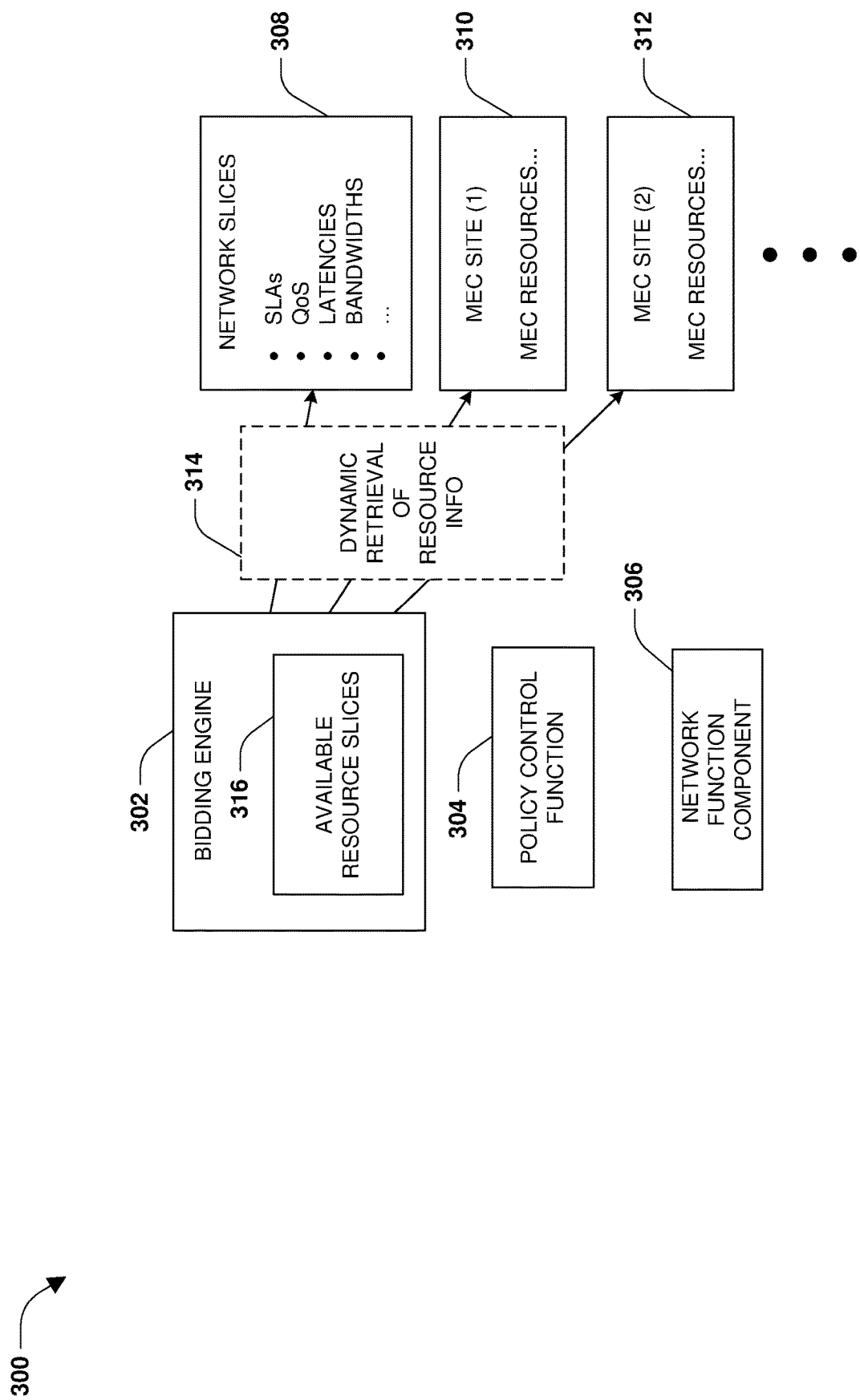
FIG. 3A is a diagram illustrating an example of a system for dynamic resource allocation for network slices, where resource information is dynamically retrieved.

FIG. 2 is a flow chart illustrating an example method for dynamic network slice resource allocation, which is described in conjunction with FIGS. 3A-3F. A bidding engine 302 maintains a dynamic list of available resource slices 316 that the bidding engine 302 tracks over time and/or in response to various events such as when performing a bidding auction. In some embodiments, the bidding engine 302 performs a dynamic retrieval 314 of resource information from various resource providers, as illustrated by FIG. 3A. The dynamic retrieval 314 may include the bidding engine 302 requesting (or being provided) resource availability and resource demand from the resource providers.

The resource availability may correspond to available CPUs, available GPUs, available memory, available storage resources, available/supported bandwidth, and/or other types of edge computing resources (compute resources) provided by compute resource providers such as a first multi-access edge computing site 310, a second multi-access edge computing site 312, etc. The resource demand may correspond to frequencies and counts of applications using the edge computing resources, timespans of such resource utilization (e.g., a certain amount of GPU usage during an evening peak time; a certain amount of GPU usage during the night; etc.), cost and charges associated with the resource utilization at certain times (e.g., charges paid by applications for certain amounts of CPU usage, storage, or other resources), amounts of resource usage at particular times, etc. The resource availability and demand may correspond to service level agreements (SLAs), quality of service (QOS), latencies, bandwidths, and/or other network slice resource availability, usage, and demand of network slices 308. In this way, the bidding engine 302 dynamically tracks and updates the dynamic list of available resource slices 316, during operation 202 of method 200.

Figure 3B:
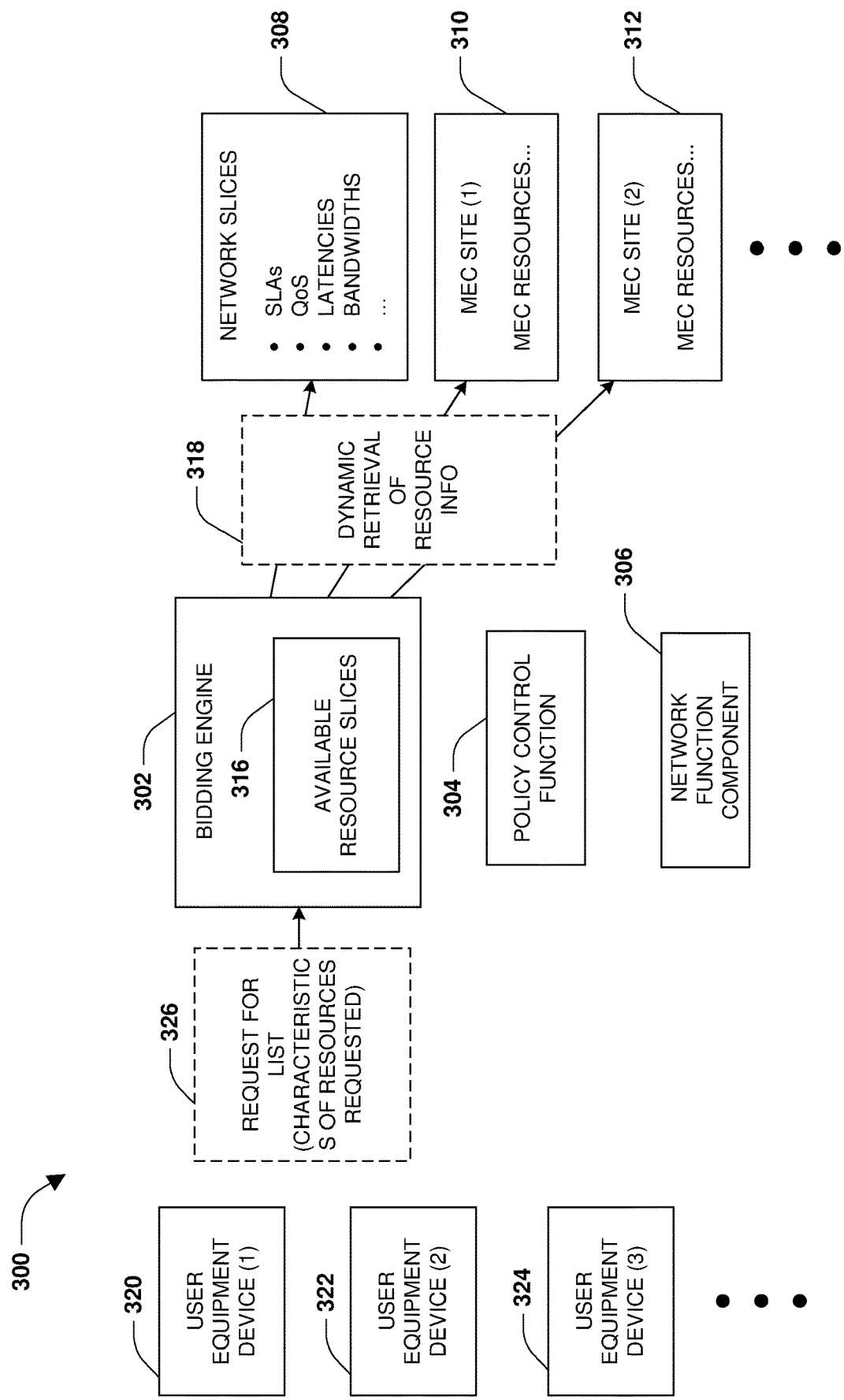
FIG. 3B is a diagram illustrating an example of a system for dynamic resource allocation for network slices, where a request for a list of available resource slices is received.

The bidding engine 302 may be part of a wireless network with which user equipment device are connected, such as a first user equipment device 320, a second user equipment device 322, a third user equipment device 324, and/or other user equipment devices. The bidding engine 302 may receive a request 326 from one or more applications hosted by one or more of the user equipment devices for a current list of resource slices available for bidding through the bidding engine 302, as illustrated by FIG. 3B. In some embodiments, the request 326 may trigger the bidding engine 302 to perform a new dynamic retrieval 318 of resource information from the network slices 308, the first multi-access edge computing site 310, the second multi-access edge computing site 312, and/or other resource providers in order to dynamically update the dynamic list of available resource slices 316 with up-to-date resource availability and demand information.

Figure 3C:
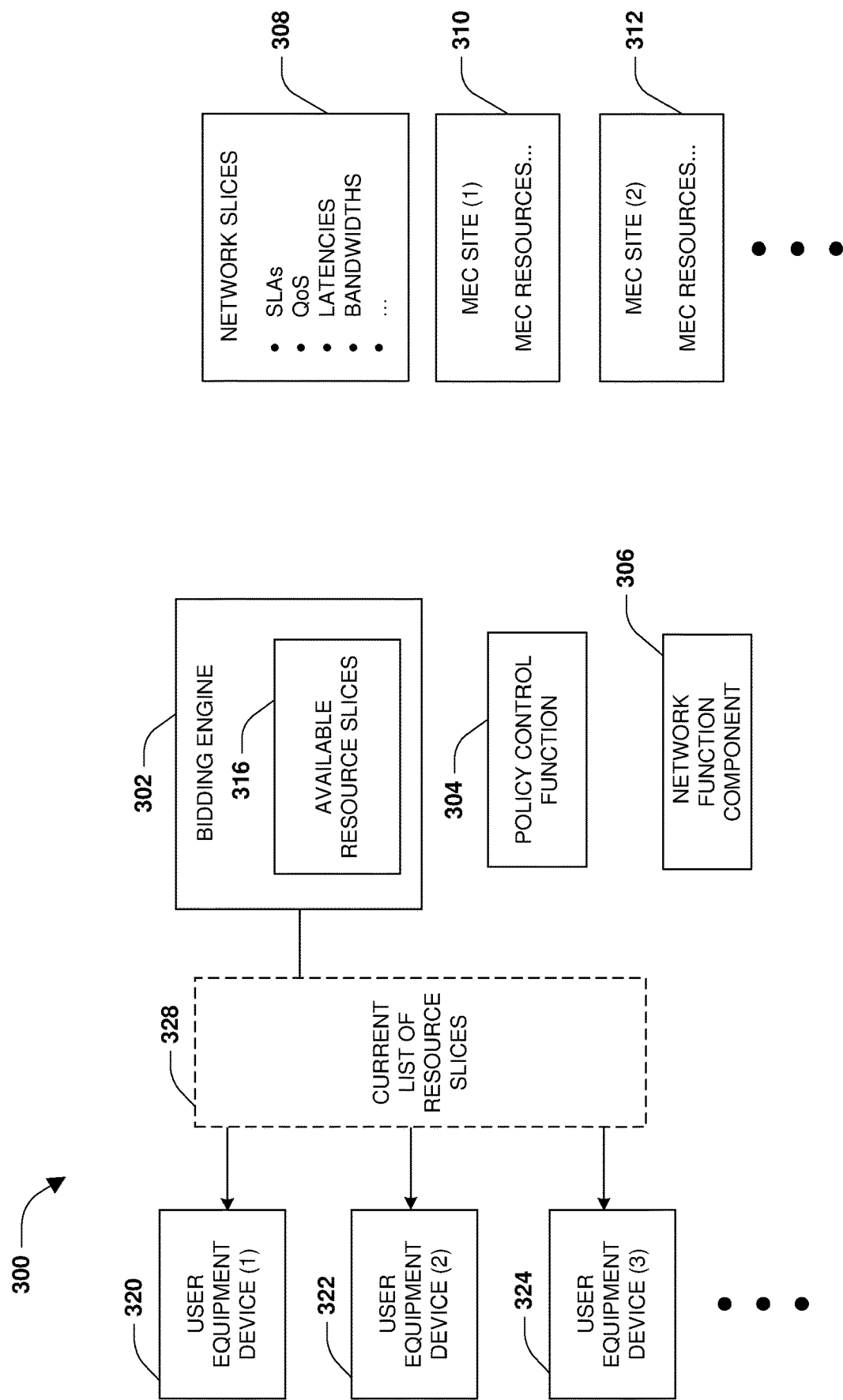
FIG. 3C is a diagram illustrating an example of a system for dynamic resource allocation for network slices, where a current list of available resource slices is provided to user equipment.

During operation 204 of method 300, the bidding engine 302 utilizes the dynamic list of available resource slices 316 to generate a current list of resource slices 328 that are available for bidding on by the applications of the user equipment devices, as illustrated by FIG. 3C. The bidding engine 302 transmits the current list of resource slices 328 over the wireless network to the applications hosted by the user equipment devices. In some embodiments of generating the current list of resource slices 328, the request 326 for the current list of resource slices 328 specifies certain characteristics being requested such as a particular amount of GPUs, CPUs, latency, bandwidth, SLA, QoS, memory storage, etc. Accordingly, the bidding engine 302 may construct the current list of resource slices 328 to include resource slices that at least satisfy the characteristics being requested, in some embodiments. In some embodiments, the current list of resource slices 328 may also include resources slices that do not satisfy the characteristics.

Figure 3D:
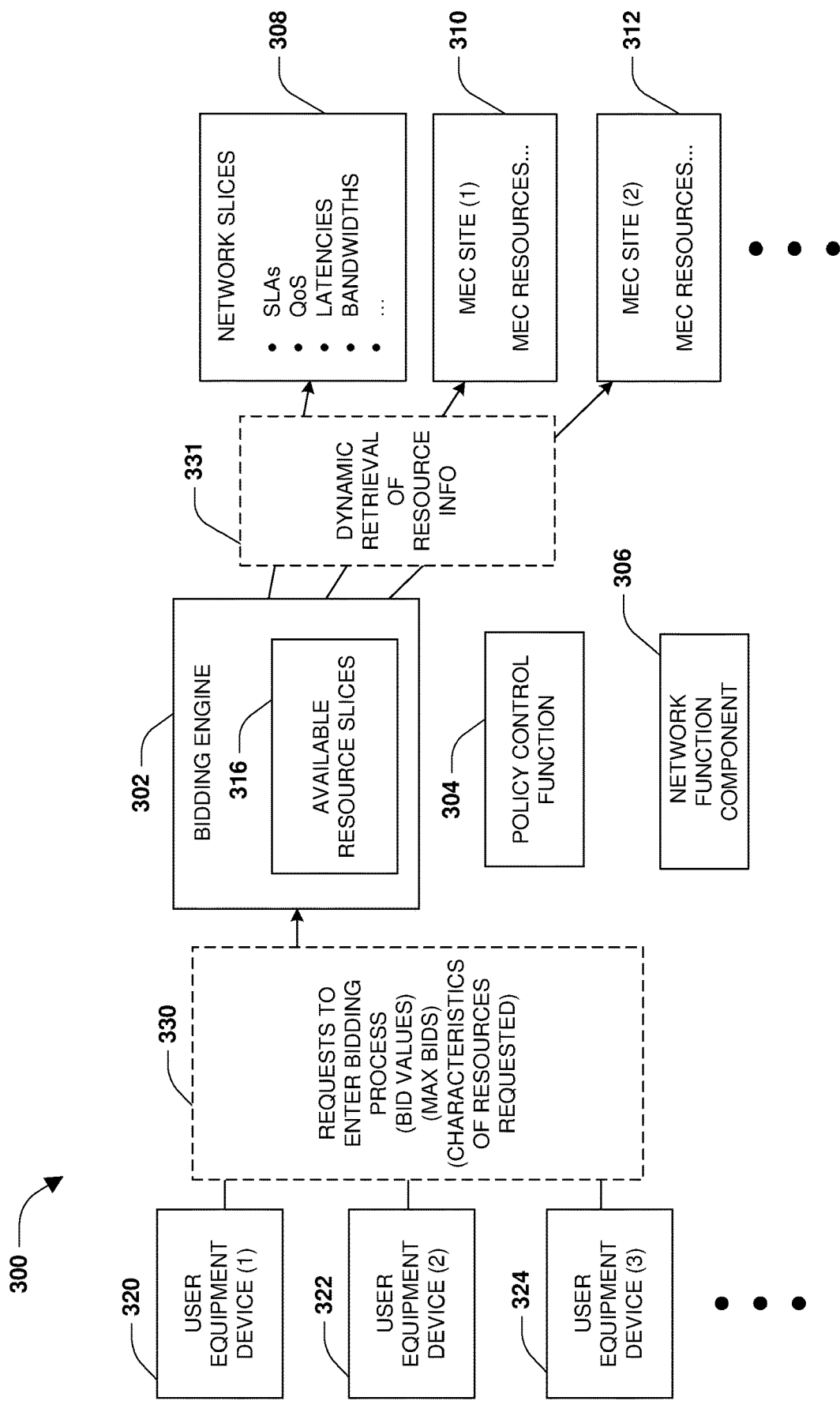
FIG. 3D is a diagram illustrating an example of a system for dynamic resource allocation for network slices, where requests to enter a bidding process are received by a bidding engine.

During operation 206 of method 200, the bidding engine 302 receives requests 330 (bidding requests) from applications hosted on the user equipment devices for joining a bidding process through which the applications can place bids for winning access to a resource slice, as illustrated by FIG. 3D. In some embodiments, the requests 330 may include bid values submitted by the applications. A bid value may indicate a starting bid value, a maximum bid value, bid value increment information (e.g., how much to increment a bid value if a current bid value has been out bid by a bid value of another application), and/or other bidding information submitted by an application. The requests 330 may include characteristics of resources being requested by the applications. In some implementations, the bidding request may identify a resource slice. Once the bid values and/or other bidding information is received by the bidding engine 302, the bidding engine 302 executes the bidding auction.

As part of the bidding auction, the bidding engine 302 compares bid values to identify one or more high bid values. In some embodiments, the bidding engine 302 may take into account maximum bid values by incrementing, based upon the bid value increment information, bid values towards the maximum bid values in order to identify the highest bid value. In some embodiments, the bidding engine 302 may contact an application whose bid value (maximum bid value) has been outbid by another application's bid value to see if the application wants to increase the maximum bid value.

In some embodiments, the bidding engine 302 may specify a minimum bid value threshold that must be exceeded before the bidding auction can be won. The minimum bid value threshold may be based upon current demand for the resource slice and/or other resources. The minimum bid value threshold may be based upon current availability of the resource slice and/or other resources. In this way, the minimum bid value threshold can be set based upon dynamically changing supply and demand of resources, which can be dynamically retrieved 331 by the bidding engine 302 from the resource providers during the bidding auction.

The current demand may be dynamically identified based upon a current demand for the resource slice during a timeframe associated with receiving the requests 330 (bidding requests). The current demand may be dynamically identified based upon predicted demand during an event (e.g., an upcoming concert where users will be streaming videos; an upcoming videogame event where users will be competing against one another; etc.). This demand may be predicted based upon history resource usage during similar events in the past. Various data sources (e.g., websites, service providers, application developers, a requesting application, etc.) may provide indications of the events. An event may correspond to a timeframe during which an application of a user equipment device is scheduling access to the resource slice (e.g., the application may indicate that the application will utilize the resource slice on Tuesday from around 6:00 pm until around 11:00 pm for playing a videogame). The current demand may be dynamically identified based upon a number of applications of user equipment devices that submitted bidding requests (requests 330)

that either specify characteristics corresponding to the resource slice or directly identify the resource slice for bidding. The current demand may be dynamically identified based upon bid values of the bidding requests of the bidding auction and/or of other bidding auctions for similar resource slices. The current demand may be dynamically identified during a timeframe between receiving the request 326 for the list of current resource slices and receiving the requests 330 (bidding requests).

In some embodiments, the bidding engine takes into account proximity of the user equipment devices to multi-access edge computing sites hosting the edge computing resources because latency may be reduced for an application hosted by a user equipment device when the user equipment device is closer to a multi-access edge computing site hosting edge computing resources being used by the application. Reduced latency may correspond to higher value for the application, which may be taken into account by the bidding auction. In some implementations, the bidding engine takes proximity into account through projected latency metrics for communications between user equipment devices and edge computing facilities.

Figure 3E:
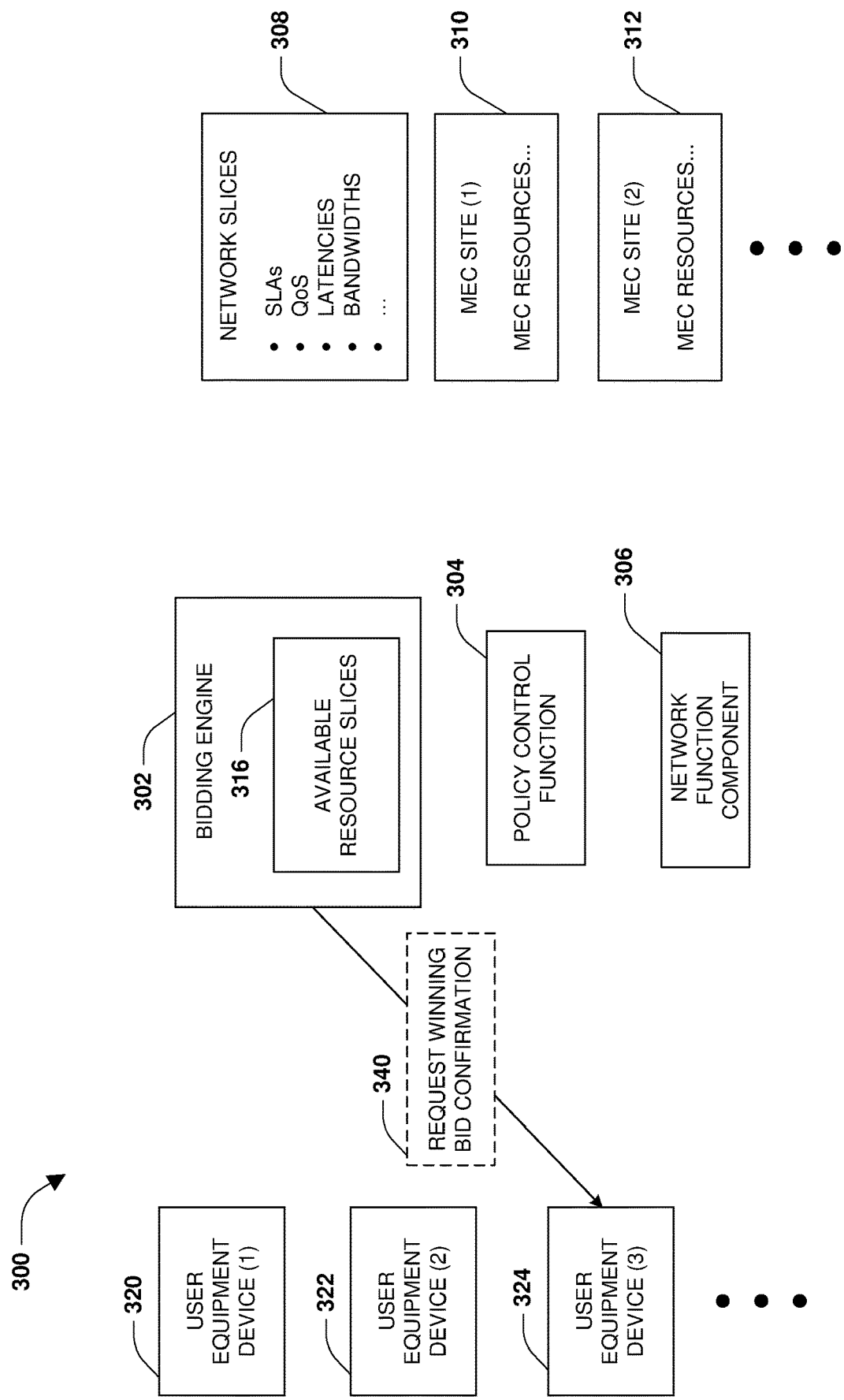
FIG. 3E is a diagram illustrating an example of a system for dynamic resource allocation for network slices, where a winner user equipment device is identified.
Figure 3F:
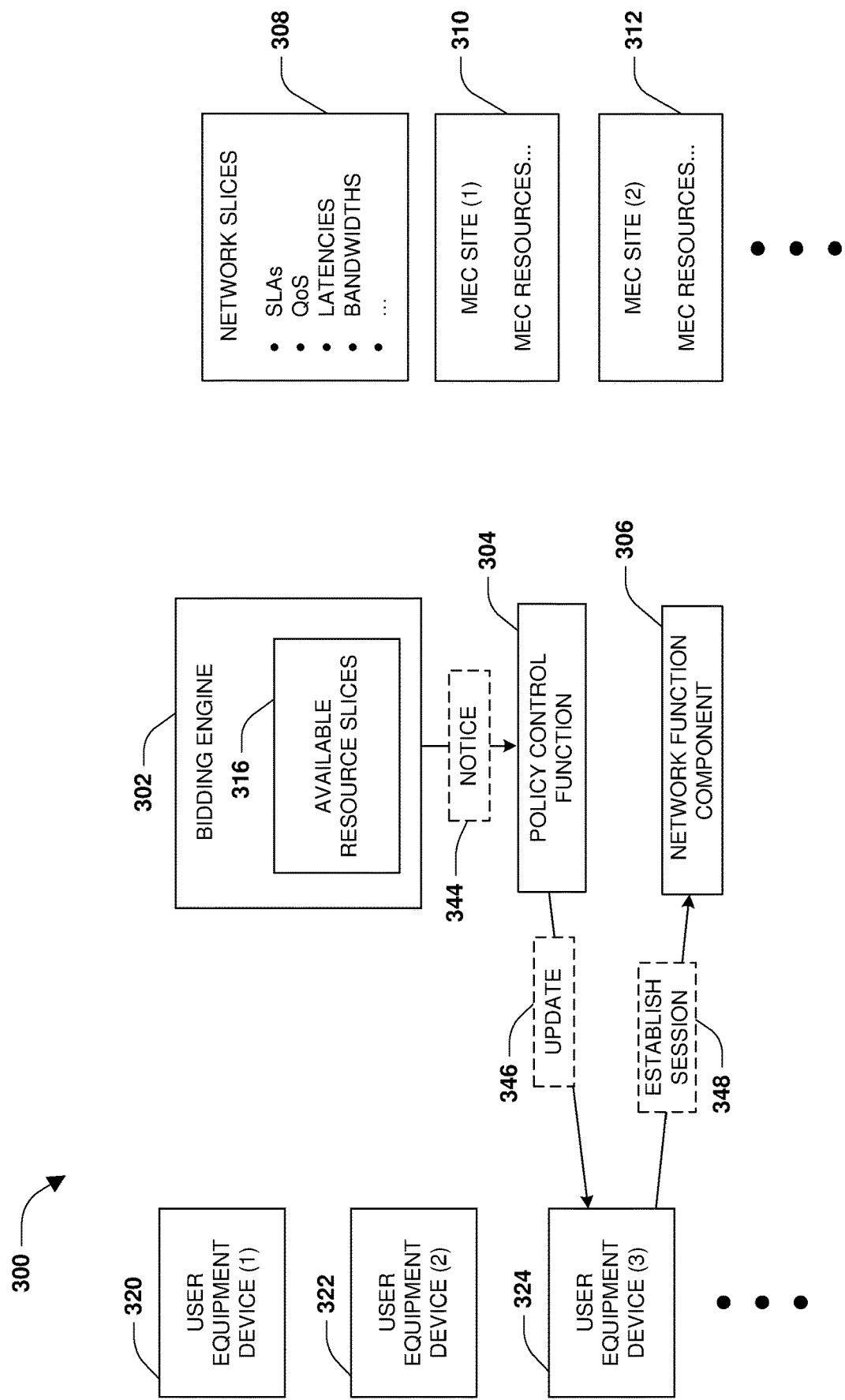
FIG. 3F is a diagram illustrating an example of a system for dynamic resource allocation for network slices, where a winner user equipment device is provided with access to a resource slice.

The bidding engine 302 identifies one or more winning user equipment devices hosting an application that won the bidding auction. In some embodiments, an application hosted by the third user equipment device 324 had a highest bid value that exceeded the minimum bid value threshold. In some implementations, the bidding engine 302 may send a request 340 to the third user equipment device 324 to confirm the winning bid, as illustrated by FIG. 3E. In response to the application hosted by the third user equipment device 324 sending a message confirming the winning bid, the bidding engine 302 provides the application with access to the resource slice during operation 208 of method 200, as illustrated by FIG. 3F. In particular, the bidding engine 302 notifies 344 the policy control function 304 to transmit an update 346 for the network slice list (an updated network slice list) to the third user equipment device 324. The update 346 may include updated user route selection policy rules that the application of the third user equipment device 324 can use to establish 348 a session with the network function component 306 using the network slice to access the edge computing resources. In this way, the application of the third user equipment device 324 can establish 348 the session with the network function component 306 for accessing the resource slice, such as for accessing a network slice (e.g., a particular SLA, QoS, latency, bandwidth, etc.) and/or edge computing resources of a particular multi-access edge computing site.

In some embodiments, the bidding engine 302 may identify one or more runner-up user equipment devices hosting applications that submitted next high bid value(s). The bidding engine 302 may offer resource slices similar to the resource slice won by the application of the third user equipment device 324. In some embodiments, the offered resource slices may have different characteristics than the resource slice won by the application of the third user equipment device 324, such as where the offered resource slices may be less performant or have higher latency due to being located further away from the one or more runner-up user equipment devices and/or having less compute resources (e.g., 5 GPUs instead of 7 GPUs, lower bandwidth, higher network latency, etc.) than the resource slice won by the application of the third user equipment device 324.

In this way, the bidding engine 302 provides for real-time bidding on network slice availability. In addition to real-time bidding on the network slice availability, the winning bid(s) is used to configure MEC usage levels to conform to the capabilities of the network slice. In some embodiments, a winning bid for a high bandwidth and low latency network slice may cause the wireless network to instruct a MEC selection system to assign a MEC instance/site that can utilize that level of network slice performance. In this way, infrastructure is deployed and configured within the wireless network for MEC resource selection, provisioning, scaling, and bidding.

Figure 4:
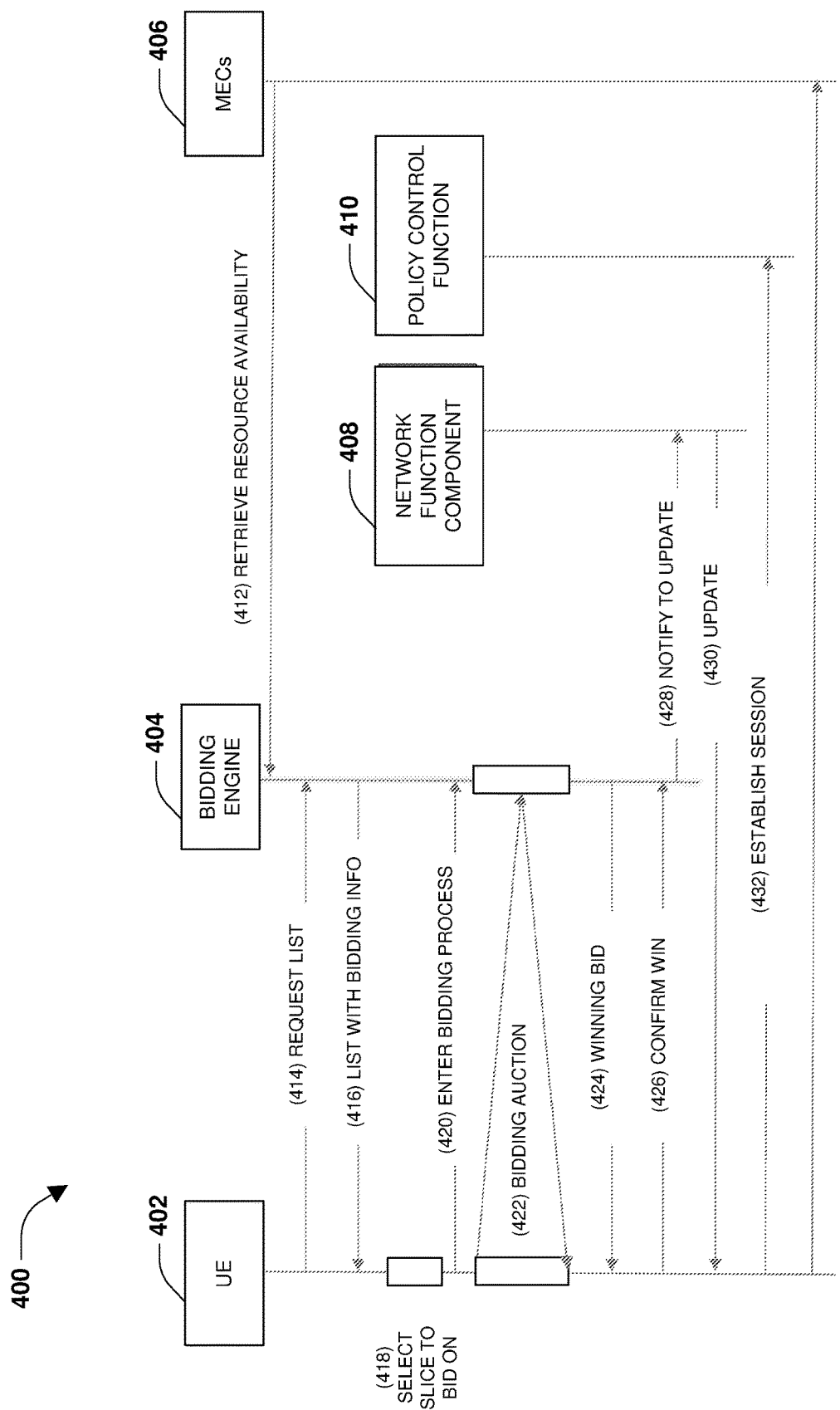
FIG. 4 is a sequence diagram illustrating an example method for dynamic resource allocation for network slices.

FIG. 4 is a sequence diagram illustrating an example method 400 for dynamic network slice resource allocation. A user equipment device 402 may be connected to a wireless network that includes a bidding engine 404, a network function component 408, a policy control function 410, and multi-access edge computing sites 406. During operation 412 of method 400, the bidding engine 404 dynamically retrieves resource availability from the multi-access edge computing sites 406. The resource availability may relate to available CPU, GPU, storage, memory, bandwidth, and/or other compute resources hosted by the multi-access edge computing sites 406. The resource availability may relate to compute resource utilization and demand information such as certain amounts and types of resources being consumed at certain times, current demand, historic demand, etc.

During operation 414 of method 400, the bidding engine 404 receives a request for a current list of resource slices from an application hosted by the user equipment device 402. The bidding engine 404 generates and transmits the current list of resource slices to the application hosted by the user equipment device 402, during operation 416 of method 400. The current list of resource slices may include bidding information for the resource slices (e.g., a minimum bid value threshold for a resource slice, a current highest bid value for a resource slice, what resources are included within a resource slice, value provided to the application by a resource slice such as an QoS, latency, bandwidth, CPU, GPU, etc., current demand for a resource slice, etc.). During operation 418 of method 400, the application selects a resource slice to bid on. During operation 420, the application sends a request to the bidding engine 404 to engage in a bidding auction for the resource slice. The bidding auction may be a new bidding auction created in response to the request or may be an active on-going bidding auction for bid requests previously received from other applications.

During operation 422, the bidding engine 404 hosts the bidding auction as a real-time bidding auction where the application can submit bid values, increase a current bid value, withdraw from the bidding auction, specify or modify a maximum bid value, etc. In response to the application hosted by the user equipment device 402 winning the bidding auction, the bidding engine 404 notifies the application that the application won the bidding auction for the resource slice, during operation 424 of method 400. During operation 426 of method 400, the bidding engine 404 receives a confirmation from the application hosted by the user equipment device 402 that the application will accept the resource slice (accept charges/cost for using the resource slice). Accordingly, the bidding engine 404 notifies the network function component 408 to transmit an updated network slice list (e.g., updated user route selection policy rules for selecting and using network slices/routes), during operation 428 of method 400. In this way, the network function component 408 transmits the updated network slice list to the user equipment device 402, during operation 430 of method 400. The application hosted by the user equipment device 402 establishes a session with the policy control function 410 for accessing the resource slice (e.g., accessing a multi-access edge computing site of the multi-access edge computing sites 406, using the network slice associated with the resource slice), during operation 432 of method 400.

According to some embodiments, a method is provided. The method includes dynamically tracking, by a bidding engine, available network slices and available edge computing resources; generating, by the bidding engine, a current list of resource slices corresponding to combinations of available network slices and available edge computing resources; conducting a bidding auction associated with the current list of resource slices to determine whether a user equipment device obtains access to a resource slice based upon dynamically identified demand for the resource slice; receiving a bidding request from the user equipment device identifying the resource slice; determining that the user equipment device wins the bidding auction for the resource slice based on the bidding request; and providing the user equipment device with access to the resource slice based upon determining that the user equipment device wins the bidding auction.

According to some embodiments, the providing the user equipment device with access to the resource slice comprises providing the user equipment device access to a network slice associated with the resource slice.

According to some embodiments, the method comprises transmitting, by a policy control function, an updated network slice list to the user equipment device, wherein the updated network slice list includes the network slice associated with the resource slice.

According to some embodiments, the updated network slice list is included in a User Route Selection Policy (URSP) update to the user equipment device.

According to some embodiments, the providing the user equipment device with access to the resource slice comprises providing the user equipment device with edge computing resources associated with the resource slice.

According to some embodiments, the method comprises dynamically identifying the demand for the resource slice based upon a current demand for the resource slice during a timeframe associated with receiving the bidding request.

According to some embodiments, the method comprises dynamically identifying the demand for the resource slice based upon an event corresponding to a timeframe during which the user equipment device is scheduling access to the available resource slices.

According to some embodiments, the method comprises dynamically identifying the demand for the resource slice based upon a number of user equipment devices submitting bidding requests specifying characteristics corresponding to the resource slice.

According to some embodiments, the demand is dynamically identified based upon bid values of the bidding requests of the user equipment devices.

According to some embodiments, the method comprises dynamically identifying the current list of resource slices and the demand during a timeframe corresponding to receiving the request and the bidding request from the user equipment device.

According to some embodiments, the method comprises receiving a request from the user equipment device for available resource slices corresponding to characteristics specified by the user equipment device; and generating the current list of resource slices to include resource slices having characteristics specified by the request from the user equipment device.

According to some embodiments, the bidding engine takes into account geographical proximity of the user equipment device to edge computing sites hosting the edge computing resources.

According to some embodiments, the bidding engine is implemented to perform efficient and optimized resource allocation by dynamically allocating the combinations of the network slices and the edge computing resources to user equipment devices based upon real-time demand for the combinations of the network slices and the edge computing resources.

According to some embodiments, a system is provided. The system comprises memory storing instructions; and one or more processors configured for executing the instructions to perform operations comprising: dynamically tracking, by a bidding engine, available network slices and available edge computing resources; generating, by the bidding engine, a current list of resource slices corresponding to combinations of available network slices and available edge computing resources; conducting a bidding auction associated with the current list of resource slices to determine whether a user equipment device obtains access to a resource slice based upon dynamically identified demand for the resource slice; receiving a bidding request from the user equipment device identifying the resource slice; determining that the user equipment device wins the bidding auction for the resource slice based on the bidding request; and providing the user equipment device with access to the resource slice based upon determining that the user equipment device wins the bidding auction.

According to some embodiments, the operations comprise utilizing maximum bid values from user equipment devices for determining a winner user equipment device, wherein the user equipment device is determined to be the winner user equipment device.

According to some embodiments, the user equipment device is determined to be a winner user equipment device, and the operations comprise determining a runner-up user equipment device of the bidding auction for the resource slice; and providing the runner-up user equipment device with access to an alternative resource slice.

According to some embodiments, at least one of a distance between the runner-up user equipment device and the alternative resource slice is greater than a distance between the runner-up user equipment device and the resource slice, an allocation of graphics processing units for the runner-up user equipment is less than an allocation of graphics processing units for the winner user equipment device, or an allocation of central processing units for the runner-up user equipment is less than an allocation of central processing units for the winner user equipment device.

According to some embodiments, a non-transitory computer-readable medium storing instructions that when executed facilitate performance of operations, is provided. The operations include dynamically tracking, by a bidding engine, available network slices and available edge computing resources; generating, by the bidding engine, a current list of resource slices corresponding to combinations of available network slices and available edge computing resources; conducting a bidding auction associated with the current list of resource slices to determine whether a user equipment device obtains access to a resource slice based upon dynamically identified demand for the resource slice; receiving a bidding request from the user equipment device identifying the resource slice; determining that the user equipment device wins the bidding auction for the resource slice based on the bidding request; and providing the user equipment device with access to the resource slice based upon determining that the user equipment device wins the bidding auction.

According to some embodiments, the operations comprise dynamically identifying the demand for the resource slice based upon a number of user equipment devices submitting bidding requests specifying characteristics corresponding to the resource slice and bid values of the bidding requests.

According to some embodiments, the user equipment device is determined to be a winner user equipment device, and the operations comprise determining a runner-up user equipment device of the bidding auction for the resource slice; and providing the runner-up user equipment device with access to an alternative resource slice.

Figure 5:
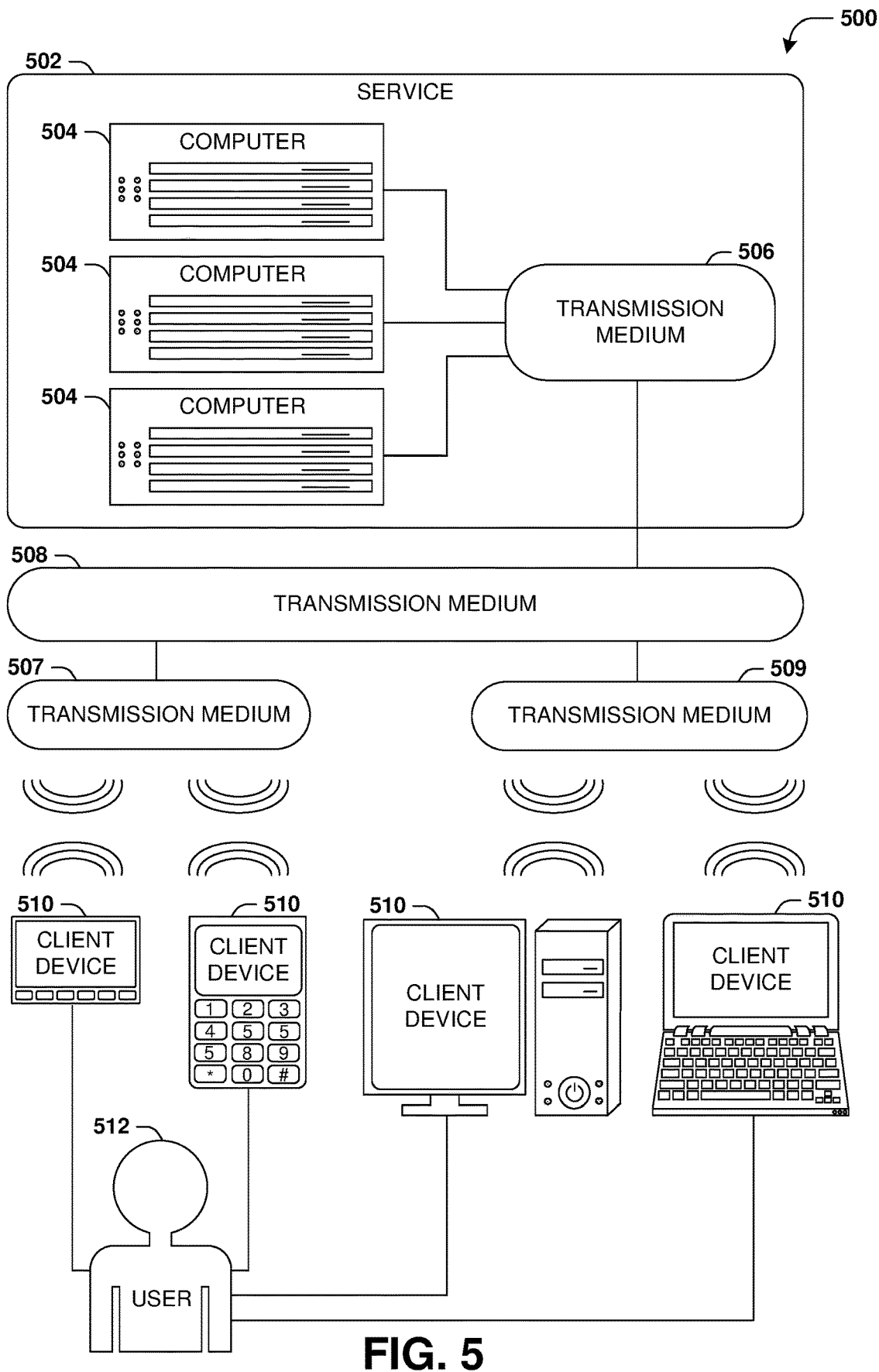
FIG. 5 is an illustration of example networks that may utilize and/or implement at least a portion of the techniques presented herein.

FIG. 5 is an interaction diagram of a scenario 500 illustrating a service 502 provided by a set of computers 504 to a set of client devices 510 via various types of transmission mediums. The computers 504 and/or client devices 510 may be capable of transmitting, receiving, processing, and/or storing many types of signals, such as in memory as physical memory states.

The computers 504 of the service 502 may be communicatively coupled together, such as for exchange of communications using a transmission medium 506. The transmission medium 506 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 502.

Likewise, the transmission medium 506 may comprise one or more sub-networks, such as may employ different architectures, may be compliant or compatible with differing protocols and/or may interoperate within the transmission medium 506. Additionally, various types of transmission medium 506 may be interconnected (e.g., a router may provide a link between otherwise separate and independent transmission medium 506).

In scenario 500 of FIG. 5, the transmission medium 506 of the service 502 is connected to a transmission medium 508 that allows the service 502 to exchange data with other services 502 and/or client devices 510. The transmission medium 508 may encompass various combinations of devices with varying levels of distribution and exposure, such as a public wide-area network and/or a private network (e.g., a virtual private network (VPN) of a distributed enterprise).

In the scenario 500 of FIG. 5, the service 502 may be accessed via the transmission medium 508 by a user 512 of one or more client devices 510, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 510 may communicate with the service 502 via various communicative couplings to the transmission medium 508. As a first such example, one or more client devices 510 may comprise a cellular communicator and may communicate with the service 502 by connecting to the transmission medium 508 via a transmission medium 507 provided by a cellular provider. As a second such example, one or more client devices 510 may communicate with the service 502 by connecting to the transmission medium 508 via a transmission medium 509 provided by a location such as the user's home or workplace (e.g., a WiFi (Institute of Electrical and Electronics Engineers (IEEE) Standard 502.11) network or a Bluetooth (IEEE Standard 502.15.1) personal area network). In this manner, the computers 504 and the client devices 510 may communicate over various types of transmission mediums. In some embodiments, the client devices 510 may correspond to user equipment devices that can bid on resource slices through a bidding engine.

Figure 6:
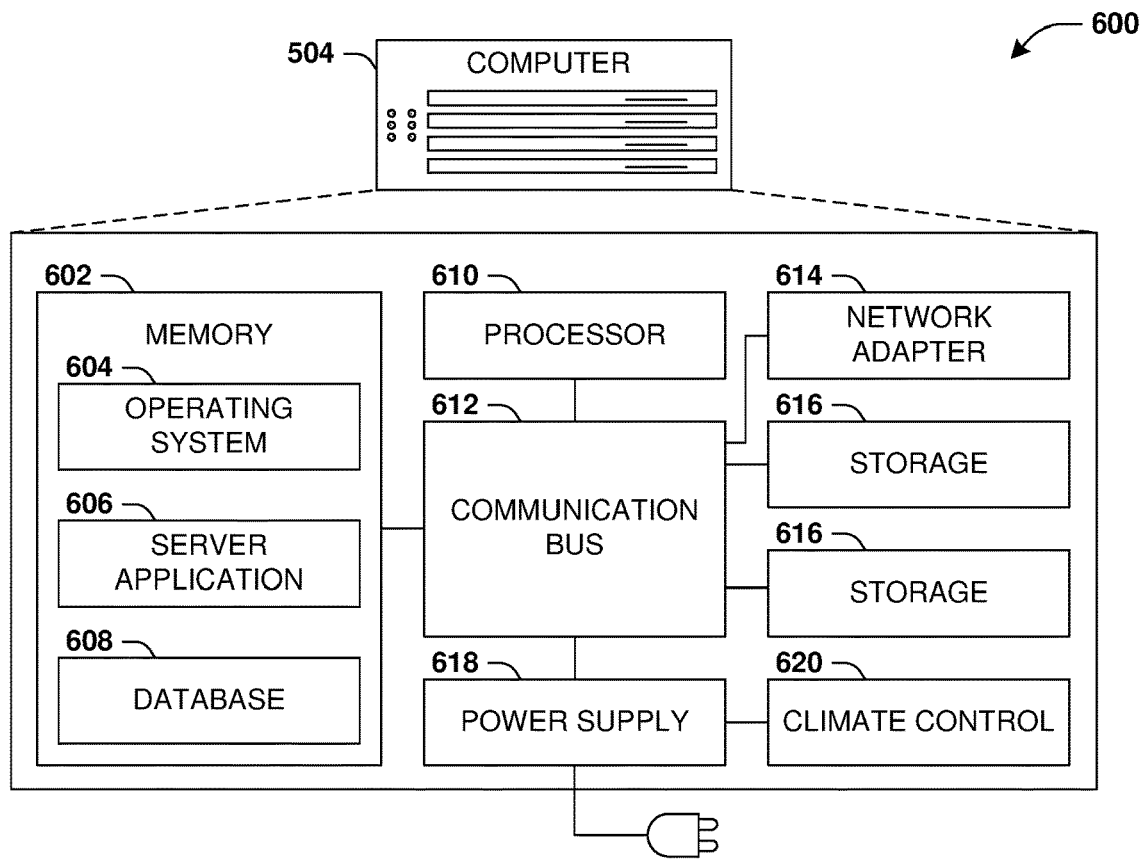
FIG. 6 is an illustration of a scenario involving an example configuration of a computer that may utilize and/or implement at least a portion of the techniques presented herein.

FIG. 6 presents a schematic architecture diagram 600 of a computer 504 that may utilize at least a portion of the techniques provided herein. Such a computer 504 may vary widely in configuration or capabilities, alone or in conjunction with other computers, in order to provide a service such as the service 502.

The computer 504 may comprise one or more processors 610 that process instructions. The one or more processors 610 may optionally include a plurality of cores; one or more coprocessors, such as a mathematics coprocessor or an integrated graphical processing unit (GPU); and/or one or more layers of local cache memory. The computer 504 may comprise memory 602 storing various forms of applications, such as an operating system 604; one or more computer applications 606; and/or various forms of data, such as a database 608 or a file system. The computer 504 may comprise a variety of peripheral components, such as a wired and/or wireless network adapter 614 connectible to a local area network and/or wide area network; one or more storage components 616, such as a hard disk drive, a solid-state storage device (SSD), a flash memory device, and/or a magnetic and/or optical disk reader.

The computer 504 may comprise a mainboard featuring one or more communication buses 612 that interconnect the processor 610, the memory 602, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 612 may interconnect the computer 504 with at least one other computer. Other components that may optionally be included with the computer 504 (though not shown in the schematic architecture diagram 600 of FIG. 6) include a display; a display adapter, such as a graphical processing unit (GPU); input peripherals, such as a keyboard and/or mouse; and a flash memory device that may store a basic input/output system (BIOS) routine that facilitates booting the computer 504 to a state of readiness.

The computer 504 may operate in various physical enclosures, such as a desktop or tower, and/or may be integrated with a display as an "all-in-one" device. The computer 504 may be mounted horizontally and/or in a cabinet or rack, and/or may simply comprise an interconnected set of components. The computer 504 may comprise a dedicated and/or shared power supply 618 that supplies and/or regulates power for the other components. The computer 504 may provide power to and/or receive power from another computer and/or other devices. The computer 504 may comprise a shared and/or dedicated climate control unit 620 that regulates climate properties, such as temperature, humidity, and/or airflow. Many such computers 504 may be configured and/or adapted to utilize at least a portion of the techniques presented herein.

Figure 7:
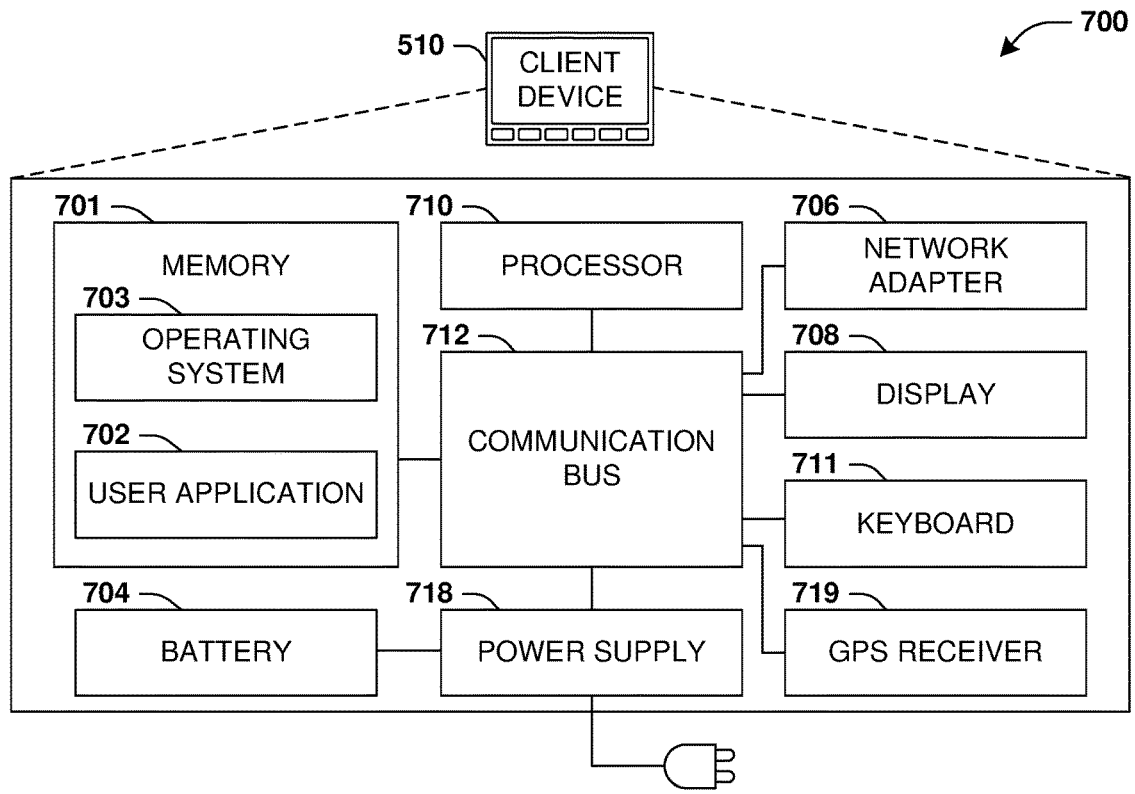
FIG. 7 is an illustration of a scenario involving an example configuration of a client that may utilize and/or implement at least a portion of the techniques presented herein.

FIG. 7 presents a schematic architecture diagram 700 of a client device 510 whereupon at least a portion of the techniques presented herein may be implemented. Such a client device 510 may vary widely in configuration or capabilities, in order to provide a variety of functionality to a user such as the user 512. The client device 510 may be provided in a variety of form factors, such as a desktop or tower workstation; an "all-in-one" device integrated with a display 708; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 510 may serve the user in a variety of roles, such as a workstation, kiosk, media player, gaming device, and/or appliance.

The client device 510 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The client device 510 may comprise memory 701 storing various forms of applications, such as an operating system 703; one or more user applications 702, such as document applications, media applications, file and/or data access applications, communication applications such as web browsers and/or email clients, utilities, and/or games; and/or drivers for various peripherals. The client device 510 may comprise a variety of peripheral components, such as a wired and/or wireless network adapter 706 connectible to a local area network and/or wide area network; one or more output components, such as a display 708 coupled with a display adapter (optionally including a graphical processing unit (GPU)), a sound adapter coupled with a speaker, and/or a printer; input devices for receiving input from the user, such as a keyboard 711, a mouse, a microphone, a camera, and/or a touch-sensitive component of the display 708; and/or environmental sensors, such as a global positioning system (GPS) receiver 719 that detects the location, velocity, and/or acceleration of the client device 510, a compass, accelerometer, and/or gyroscope that detects a physical orientation of the client device 510. Other components that may optionally be included with the client device 510 (though not shown in the schematic architecture diagram 700 of FIG. 7) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 510 to a state of readiness; and a climate control unit that regulates climate properties, such as temperature, humidity, and airflow.

The client device 510 may comprise a mainboard featuring one or more communication buses 712 that interconnect the processor 710, the memory 701, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 510 may comprise a dedicated and/or shared power supply 718 that supplies and/or regulates power for other components, and/or a battery 704 that stores power for use while the client device 510 is not connected to a power source via the power supply 718. The client device 510 may provide power to and/or receive power from other client devices.

Figure 8:
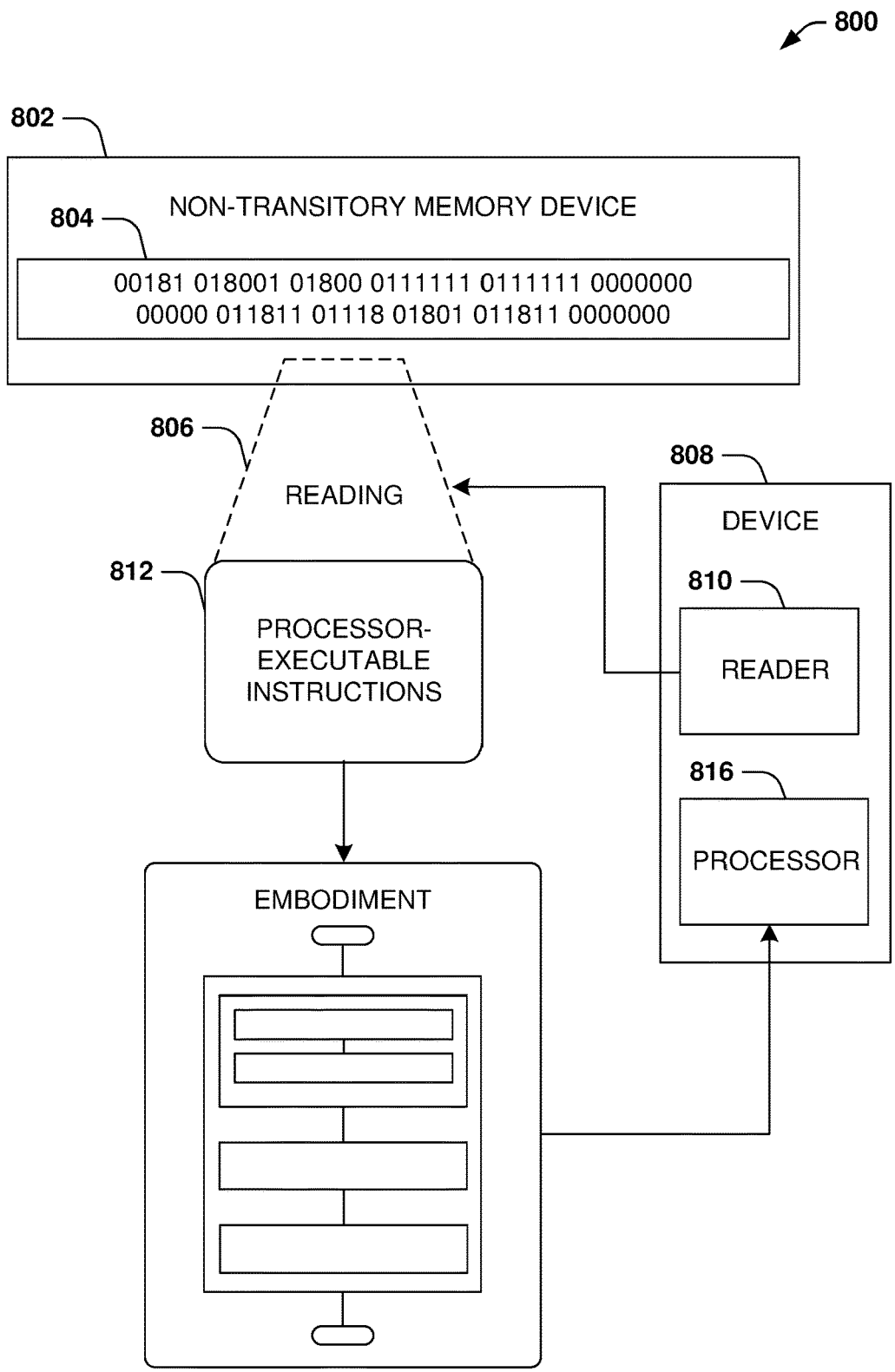
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 200 of FIG. 2 and/or at least some of the example method 400 of FIG. 4, for example. In some embodiments, the processor-executable instructions 812 are configured to cause implementation of a system, such as at least some of the example system 100 of FIG. 1 and/or at least some of the example system 300 of FIGS. 3A-3F.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed:

1. A method, comprising:
dynamically tracking, by a bidding engine, available network slices and available edge computing resources;
generating, by the bidding engine, a current list of resource slices corresponding to combinations of available network slices and available edge computing resources;
conducting a bidding auction associated with the current list of resource slices to determine whether a user equipment device obtains access to a resource slice based upon dynamically identified demand for the resource slice;
receiving a bidding request from the user equipment device identifying the resource slice;
determining that the user equipment device wins the bidding auction for the resource slice based on the bidding request; and
providing the user equipment device with access to the resource slice based upon determining that the user equipment device wins the bidding auction.

2. The method of claim 1, wherein the providing the user equipment device with access to the resource slice comprises providing the user equipment device access to a network slice associated with the resource slice.

3. The method of claim 2, further comprising:
transmitting, by a policy control function, an updated network slice list to the user equipment device, wherein the updated network slice list includes the network slice associated with the resource slice.

4. The method of claim 3, wherein the updated network slice list is included in a User Route Selection Policy (URSP) update to the user equipment device.

5. The method of claim 1, wherein the providing the user equipment device with access to the resource slice comprises providing the user equipment device with edge computing resources associated with the resource slice.

6. The method of claim 1, comprising:
dynamically identifying the demand for the resource slice based upon a current demand for the resource slice during a timeframe associated with receiving the bidding request.

7. The method of claim 1, comprising:
dynamically identifying the demand for the resource slice based upon an event corresponding to a timeframe during which the user equipment device is scheduling access to the available resource slices.

8. The method of claim 1, comprising:
dynamically identifying the demand for the resource slice based upon a number of user equipment devices submitting bidding requests specifying characteristics corresponding to the resource slice.

9. The method of claim 8, wherein the demand is dynamically identified based upon bid values of the bidding requests of the user equipment devices.

10. The method of claim 1, comprising:
dynamically identifying the current list of resource slices and the demand during a timeframe corresponding to receiving the request and the bidding request from the user equipment device.

11. The method of claim 1, comprising:
receiving a request from the user equipment device for available resource slices corresponding to characteristics specified by the user equipment device; and
generating the current list of resource slices to include resource slices having characteristics specified by the request from the user equipment device.

12. The method of claim 1, wherein the bidding engine takes into account geographical proximity of the user equipment device to edge computing sites hosting the edge computing resources.

13. The method of claim 1, wherein the bidding engine is implemented to perform efficient and optimized resource allocation by dynamically allocating the combinations of the network slices and the edge computing resources to user equipment devices based upon real-time demand for the combinations of the network slices and the edge computing resources.

14. A system, comprising:
memory storing instructions; and
one or more processors configured for executing the instructions to perform operations comprising:

dynamically tracking, by a bidding engine, available network slices and available edge computing resources;

generating, by the bidding engine, a current list of resource slices corresponding to combinations of available network slices and available edge computing resources;

conducting a bidding auction associated with the current list of resource slices to determine whether a user equipment device obtains access to a resource slice based upon dynamically identified demand for the resource slice;

receiving a bidding request from the user equipment device identifying the resource slice;

determining that the user equipment device wins the bidding auction for the resource slice based on the bidding request; and providing the user equipment device with access to the resource slice based upon determining that the user equipment device wins the bidding auction.

15. The system of claim 14, wherein the operations comprise:

utilizing maximum bid values from user equipment devices for determining a winner user equipment device, wherein the user equipment device is determined to be the winner user equipment device.

16. The system of claim 14, wherein the user equipment device is determined to be a winner user equipment device, and wherein the operations comprise:

determining a runner-up user equipment device of the bidding auction for the resource slice; and providing the runner-up user equipment device with access to an alternative resource slice.

17. The system of claim 16, wherein at least one of a distance between the runner-up user equipment device and the alternative resource slice is greater than a distance between the runner-up user equipment device and the resource slice, an allocation of graphics processing units for the runner-up user equipment is less than an allocation of graphics processing units for the winner user equipment device, or an allocation of central processing units for the runner-up user equipment is less than an allocation of central processing units for the winner user equipment device.

18. A non-transitory computer-readable medium storing instructions that when executed facilitate performance of operations comprising:

dynamically tracking, by a bidding engine, available network slices and available edge computing resources;

generating, by the bidding engine, a current list of resource slices corresponding to combinations of available network slices and available edge computing resources;

conducting a bidding auction associated with the current list of resource slices to determine whether a user equipment device obtains access to a resource slice based upon dynamically identified demand for the resource slice;

receiving a bidding request from the user equipment device identifying the resource slice;

determining that the user equipment device wins the bidding auction for the resource slice based on the bidding request; and providing the user equipment device with access to the resource slice based upon determining that the user equipment device wins the bidding auction.

19. The non-transitory computer-readable medium of claim 18, wherein the operations comprise:

dynamically identifying the demand for the resource slice based upon a number of user equipment devices submitting bidding requests specifying characteristics corresponding to the resource slice and bid values of the bidding requests.

20. The non-transitory computer-readable medium of claim 18, wherein the user equipment device is determined to be a winner user equipment device, and wherein the operations comprise:

determining a runner-up user equipment device of the bidding auction for the resource slice; and providing the runner-up user equipment device with access to an alternative resource slice.

* * * * *